United States Patent [19]

Ghrist, III

[11] Patent Number: 4,512,185
[45] Date of Patent: Apr. 23, 1985

[54] STEAM TURBINE VALVE TEST SYSTEM
[75] Inventor: William D. Ghrist, III, Blawnox, Pa.
[73] Assignee: Westinghouse Electric Corp., Pittsburgh, Pa.
[21] Appl. No.: 538,390
[22] Filed: Oct. 3, 1983
[51] Int. Cl.³ ............................................ G01M 15/00
[52] U.S. Cl. ................................................... 73/118
[58] Field of Search ...................... 73/118; 364/494; 60/660; 290/40 R, 52

[56] References Cited

U.S. PATENT DOCUMENTS 3,928,977 12/1975 Braytenbah et al. ................ 60/660
4,019,390 4/1977 Smith et al. ...................... 60/660 X
4,245,162 1/1981 Ronnen et al. ................. 364/494 X Primary Examiner—Jerry W. Myracle
Attorney, Agent, or Firm—D. Schron

[57] ABSTRACT

A valve test system for closing off certain governor valves under steam flow conditions while still maintaining a substantially constant steam flow. A plurality of valve position demand signals is calculated for the respective governor valves with the signals being fully compensated with respect to non-linear flow characteristics of the valve. A valve test signal is injected in the control arrangement prior to the calculation of the valve position demand signals and causes closures of the valves under test and a proportionate further opening of the remaining valves.

8 Claims, 5 Drawing Figures

4,512,185

STEAM TURBINE VALVE TEST SYSTEM

BACKGROUND OF THE INVENTION

1. Field of the Invention

The invention in general relates to steam turbines, and particularly to an arrangement for testing the steam admission valves thereof.

2. Description of the Prior Art

In the operation of a steam turbine-generator power plant, a steam source produces steam which is provided to a turbine system consisting of one or more turbines. The regulation of the steam through the tubine system is governed by the positioning of a plurality of steam admission valves and as the steam expands through the turbine, or turbines, work is extracted and utilized by an electrical generator for producing electricity which is supplied to a power system network through a circuit breaker arrangement, when closed.

In a typical arrangement, the steam admission valves include a plurality of throttle valves, also known as stop valves, and a plurality of governor valves, also known as control or steam chest valves. The throttle valves are used for controlling the steam flow to the turbine during the period the turbine is being brought up to speed and are additionally used to shut off the flow of steam to the turbine in the event of overspeeding beyond a predetermined value. The governor valves, when in control, provide the function of precisely regulating the speed and load of the turbine by controlling the steam flow.

In the operation of the power plant the throttle valves must be exercised periodically to detect possible valve stem sticking and provisions are made to test close these valves from some test station or operator's panel. In addition, it is often desirable to test individual ones of the governor valves.

Since the lift-versus-flow characteristics of the steam admission valves are non-linear, most advanced control systems generally provide some sort of dynamic valve characteristic and flow compensation arrangement. The present invention relates to an improved valve test system which permits the control response of the valves to remain linear during testing and provides for a stable load level with only minimal reliance on load feedback circuits normally provided with such control systems.

SUMMARY OF THE INVENTION

The valve test system includes means for generating individual compensated governor valve position demand signals which are provided to respective valve position control circuits. A first distributing means distributes a desired total effective valve opening reference signals among all of the valve position demand signals. A valve test signal is generated for a test and is distributed among only selected ones of the valve position demand signals. The test signal is also utilized to further open the valves not being closed off so as to maintain substantially constant stem flow during the test.

DESCRIPTION OF THE PREFERRED EMBODIMENT

Figure 1:
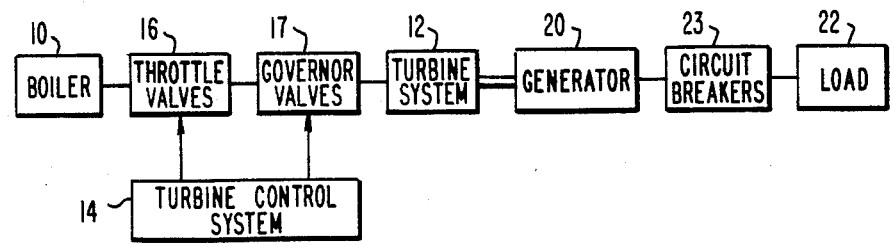
FIG. 1 is a simplified block diagram of a steam turbine generator power plant.

FIG. 1 illustrates a simplified diagram of a typical steam turbine-generator power plant. A steam source 10 such as a boiler is operative to generate and supply steam to a turbine arrangement 12 which may consist of a single turbine, or more commonly, a plurality of units such as a high pressure, intermediate pressure and low pressure turbine.

A turbine control system 14 is operative in response to certain input signals to generate control signals for governing operation of a throttle valve arrangement 16 and a governor valve arrangement 17 for precisely controlling the steam supplied to the turbine system 12.

The turbines are operable to drive the generator 20 for the production of electricity which is supplied to a load 22 when main circuit breakers 23 are closed. Typically, the load 22 may be a power system network which is supplied with electricity from a plurality of such power plants.

Figure 2:
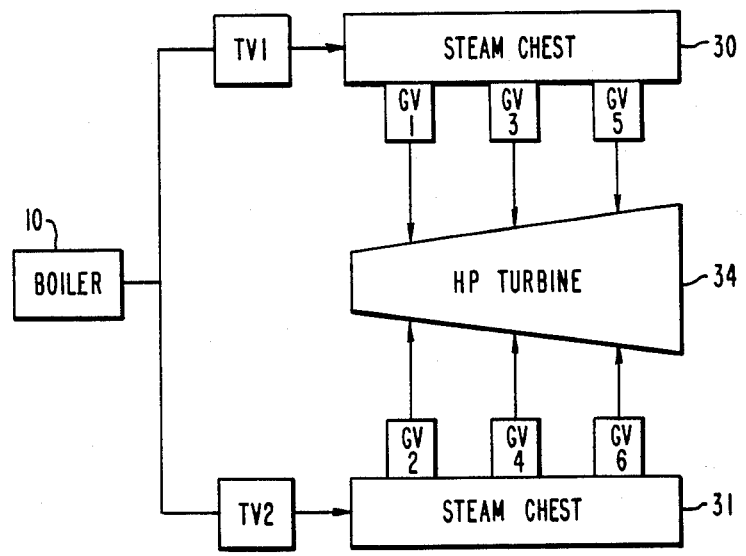
FIG. 2 is a block diagram illustrating the steam admission valve arrangement of FIG. 1 in somewhat more detail.

FIG. 2 illustrates in somewhat more detail the steam supply valving arrangement which, by way of illustration, includes two throttle valves TV1 and TV2 and six governor valves GV1 to GV6. Steam from boiler 10 is supplied via respective throttle valves TV1 and TV2 to steam chests 30 and 31 and then to high pressure turbine 34 by way of the governor valves, with the odd-numbered governor valves GV1, GV3 and GV5 being integral with steam chest 30 and the even-numbered governor valves GV2, GV4 and GV6 being integral with steam chest 31.

The present invention is operable with an improved turbine control system described in U.S. Pat. No. 4,368,520 assigned to the assignee of the present invention and hereby incorporated by reference. A simplified block diagram of the control system is presented in FIG. 3 as background.

The control system includes a base controller 38a having memory means for storing digital information including data and operating instructions as well as digital processing circuitry for processing the digital information. The reliability of the overall system is improved by incorporating a second controller 38b having the identical structure as, and being in communication with, controller 38a.

Figure 3:
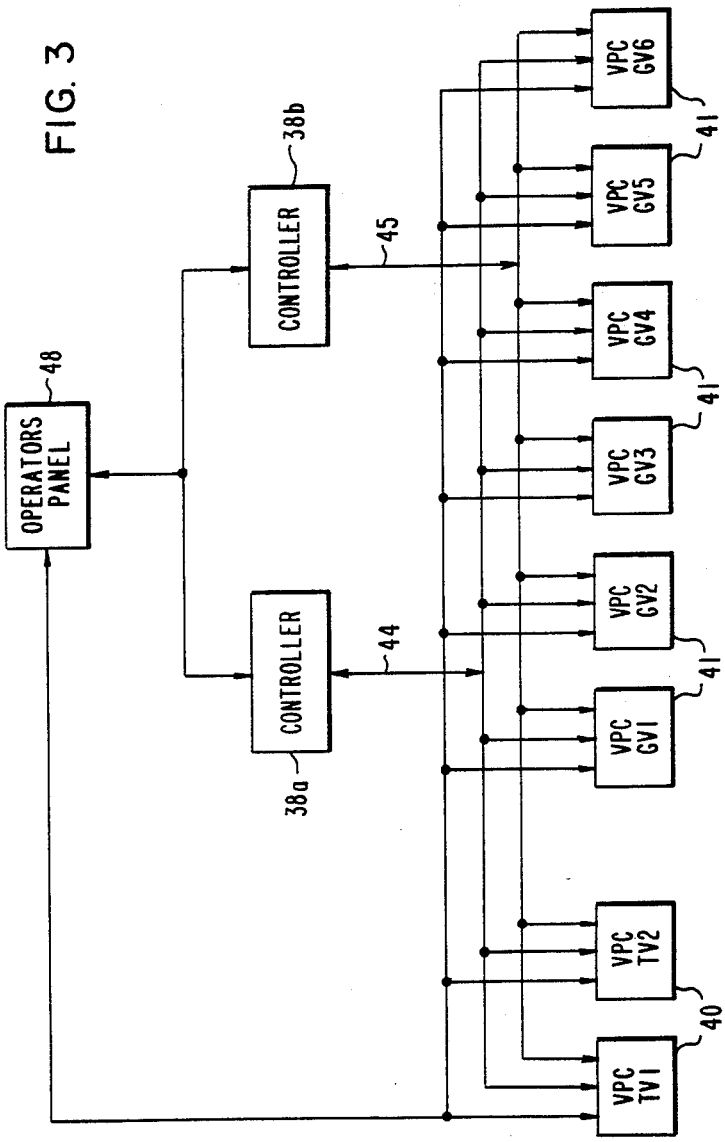
FIG. 3 is a block diagram of a turbine control system in which the present invention is applicable.

The system is divided into several interconnecting and coordinated functional modules with each functional module incorporating its own processing capability to execute its specific function. In FIG. 3, the functional modules include valve position control (VPC) circuits 40 for controlling throttle valves TV1 and TV2, with additional valve position control circuits 41 being operable to control respective governor valves GV1 to GV6. Each valve position control circuit includes its own memory means for storing digital information including data and operating instructions as well as digital processing circuitry for processing the digital information, such function ideally being provided by a microcomputer.

By means of a redundant two-way digital data links 44 and 45, digital information may be conveyed from the valve position control circuits to both controllers 38a and 38b, whereas only one selected controller 38a or 38b transmits digital information down to the valve position control circuits.

The turbine control system additionally includes an operator's panel 48 in two-way communication with both controllers 38a and 38b as well as with all of the valve position control circuits. This latter connection enables various parameters to be communicated to the operator and allows the operator to place the system under direct manual control. Details of the controllers and valve position control circuits are described in the referenced patent.

Figure 4:
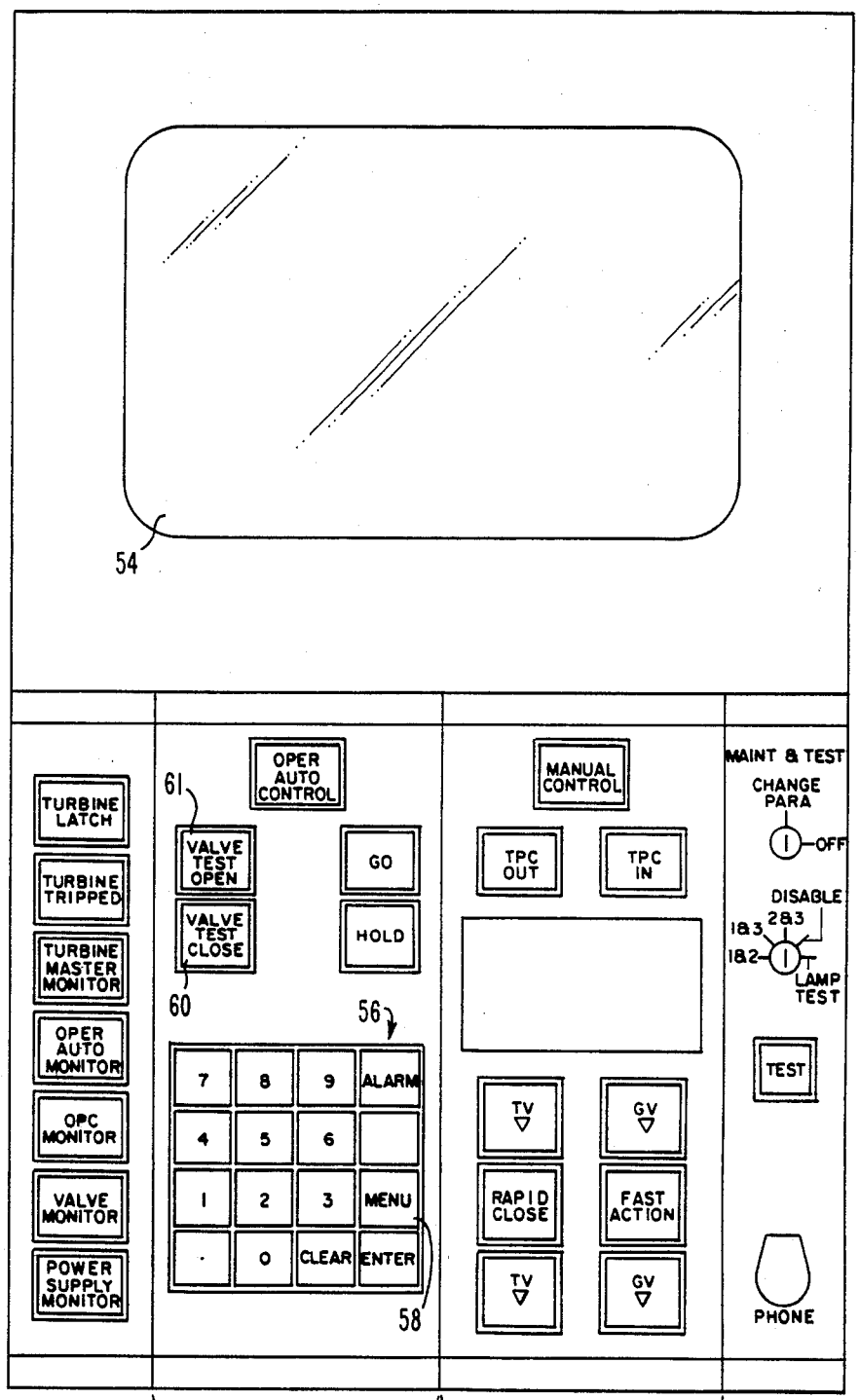
FIG. 4 is a more detailed view of the operator's panel of FIG. 3.

A typical operator's panel is illustrated in FIG. 4 and represents an alternate form to that shown in the referenced patent in that only one level of automatic control is provided instead of two, as in the patent. The panel includes a manual section 50 which may be used for backup control, and an automatic section 52 operational in conjunction with a CRT 54 and keyboard 56 for various operator interactions with the controllers 38a and 38b.

By activation of menu push button 58 of keyboard 56, the operator can place on the CRT a list of various features which may be selected by number, one of which is the valve test of the present invention. When in the valve test mode, activation of valve test close push button 60 will initiate the valve test, after which the valves will remain in a closed position until the valve test open push button 61 is activated.

Figure 5:
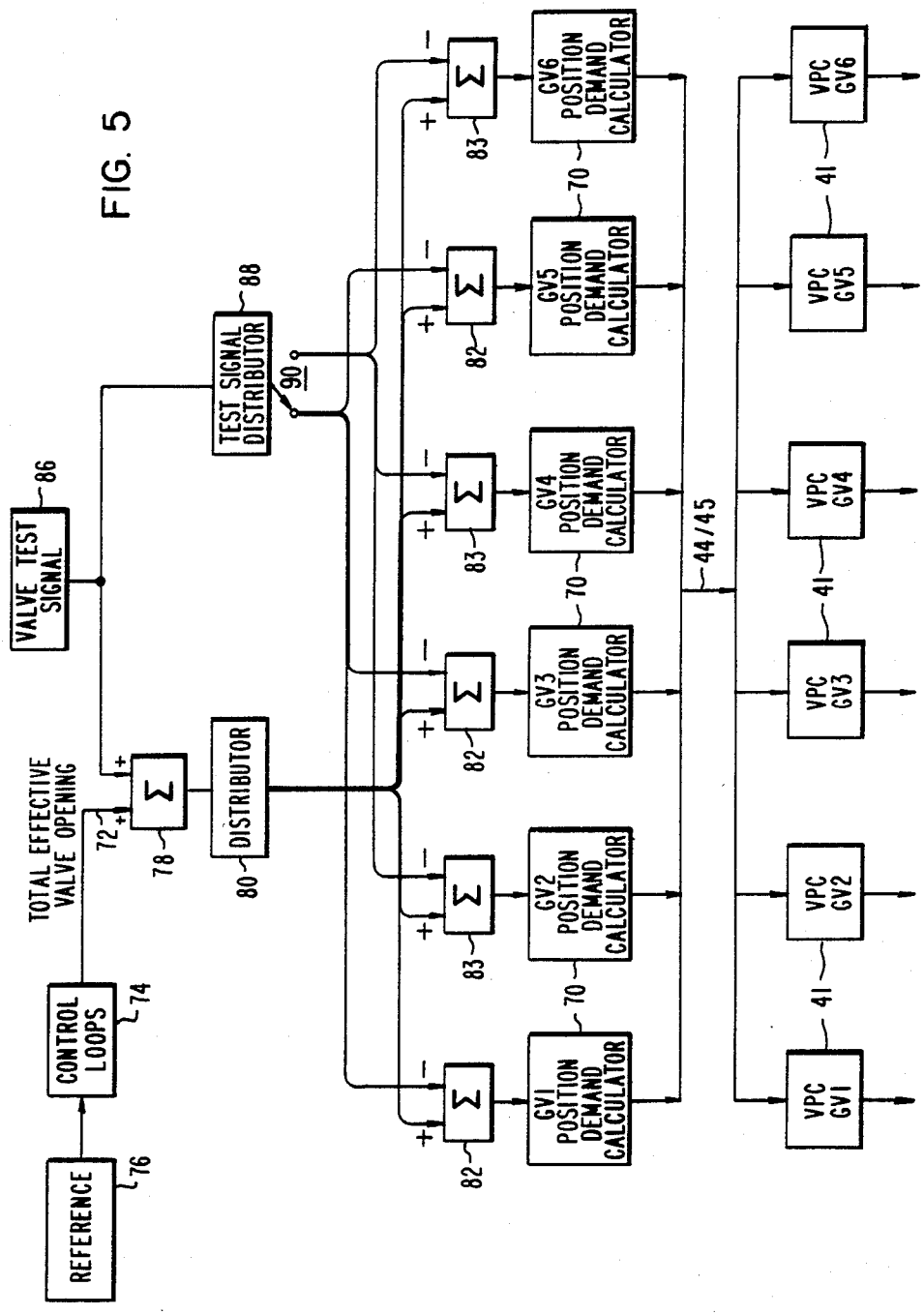
FIG. 5 is a block diagram of an embodiment of the present invention.

The valve test arrangement gradually closes one or more governor valves while opening the others in order to maintain a substantially constant steam flow, and accordingly a substantially constant load during the test. One embodiment is illustrated in FIG. 5 wherein the previously mentioned valve position control circuits 41 for the governor valves are reproduced in the lower portion of the Figure, whereas the remaining blocks functionally reside in controller 38a or 38b (FIG. 3) and communicate signals to the valve position control circuits via the data link 44 or 45.

The individual valve position demand signals sent down the data link for governor valve control are generated by governor valve position demand calculators 70 operable to receive a respective uncompensated valve position demand signal and to apply any unnecessary dynamic valve characteristic and flow compensation to the signal for transmission down the data link.

A total effective valve opening signal is generated on line 72 in response to the application of a number of control loops 74 to a reference signal provided by reference block 76. The generation of a total effective valve opening utilizing the reference and control loops is a well-known operation of a digital electrohydraulic turbine control system such as described in the January 1974 issue of *The Westinghouse Engineer* and as described in numerous U.S. patents, a representative number of which include U.S. Pat. Nos. 4,029,266; 4,090,065; 4,220,869; 4,227,093; 4,246,491 and 4,258,424 to name a few.

The total effective valve opening signal on line 72 is provided, via a summer 78, to distributor 80 which functions to distribute the total effective valve opening among all of the positions demand calculators 70 in proportion to the total amount of flow each valve can carry. In some systems, the signal will be distributed evenly among all of the calculators, whereas in other systems the distribution may differ slightly from calculator in view of the fact that some of the governor valves may feed a larger number of nozzles in the turbine than the others. Thus, in the present example in response to the generation of the total effective valve opening signal, the distributor 80 outputs six individual valve signals which are provided to respective governor valve position demand calculators 70 via respective summers 82 or 83.

When a valve test is to be performed, valve test signal generator 86 is caused to provide a valve test signal which ramps gradually from zero once the test is initiated. The valve test signal is provided to test signal distributor 88 which functions to proportion the signal among those position demand calculators associated with the governor valve being closed. Thus, in the example of FIG. 5 with the two-position switch 90 in the position illustrated, the test signal is distributed to the position demand calculators for governor valves GV1, GV3 and GV5 in a manner that the test signal so provided is subtracted in summers 82 from the respective signal provided by distributor 80. When the switch 90 is in the other of its two positions, the test signal will be subtracted in summers 83 from the distributor 80 signal provided to the position demand calculators of governor valves GV2, GV4 and GV6.

The subtraction of the ramping signal will cause the closure of governor valves GV1, GV3 and GV5 (FIG. 2) so that throttle valve TV1 may be tested or will cause the closure of governor valves GV2, GV4 and GV6 so that throttle valve TV2 may be tested. During such test it is desired that the total steam flow or load remains substantially constant and, accordingly, those governor valves not being closed will have to open by a proportionate amount such that the net effective opening of all of the valves remains unchanged to the extent possible. This is accomplished by adding the valve test signal from generator 86 to the total effective valve opening called for, on line 72, the addition taking place in summer 78 such that distributor 80 functions to proportionally distribute the valve test signal among all of the position demand calculators. Thus, although the test signal causes closure of half the valves, it will additionally cause a compensating further opening of the remaining valves.

After the governor valves are closed, the associated throttle valve may be tested and thereafter the test signal may be ramped gradually back toward zero when the valve test open push button is activated so as to open the previously closed governor valves and to proportionally close the open governor valves.

FIG. 2 illustrates an example of a single-ended steam chest. In those turbine systems having a double-ended steam chest, that is, two throttle valves per steam chest, there is generally no need to close off the governor valves for a throttle valve test since the other throttle valve of the steam chest can carry the steam flow. The arrangement of FIG. 5, however, can still be used with such systems, for the testing of individual governor valves. In that instance, the test signal distributor will provide the test signal to only a selected one or more of the position demand calculators associated with the one or more governor valves being tested.

Accordingly, a steam turbine valve test system has been described which allows for the maintenance of an established steam flow while still closing off one or more governor valves. The valve test signals are injected into the control scheme upstream of the valve characteristic and flow compensation performed by the position demand calculators such that the necessary computation for accurate control is correct not only prior to, but during the test operation.

I claim:

1. A valve test system for a steam turbine having at least a throttle valve and a plurality of governor valves for controlling steam admission to the turbine, comprising:
   (a) calculator means (70) for generating a plurality of individual governor valve position demand signals;
   (b) a plurality of individual valve position control circuits (41) each for governing operation of a respective one of said governor valves in response to a respective input valve position demand signal;
   (c) means for supplying a desired total effective valve opening reference signal (72);
   (d) means for providing a valve test signal (86);
   (e) first means (80) for distributing said reference signal among all of said governor valve position demand signals;
   (f) second means (88) for distributing said valve test signal among only selected ones of said governor valve position demand signals;
   (g) means for subtracting (82/83) the distributed signals of said second means from those of said first means.

2. Apparatus according to claim 1, which includes:
   (a) means for adding (78) said valve test signal to said reference signal whereby said valve test signal is distributed by said first means among all of said governor valve position demand signals.

3. Apparatus according to claim 1 wherein:
   (a) said turbine includes a plurality of steam chests (30/31) for delivering steam to said turbine;
   (b) each said steam chest having a plurality of governor valves (GV1, GV3, GV5/GV2, GV4, GV6) and only one throttle valve (TV1/TV2).

4. Apparatus according to claim 3 wherein during a valve test process:
   (a) the odd numbered governor valves are simultaneously closed while the even numbered governor valves are simultaneously opened.

5. Apparatus according to claim 3 wheren during a valve test process:
   (a) the odd numbered governor valves are simultaneously opened while the even numbered governor valves are simultaneously closed.

6. Apparatus according to claim 1 wherein:
   (a) said valve test signal is a ramp signal.

7. Apparatus according to claim 1 wherein:
   (a) said calculator means is operable to modify the signals provided by said first means to as to compensate for non linear valve characteristics.

8. Apparatus according to claim 1 which includes:
   (a) an operator's panel;
   (b) means (56/61) on said operator's panel for providing said valve test signal.

* * * * *